(12) United States Patent
Mori

(10) Patent No.: US 6,299,249 B1
(45) Date of Patent: Oct. 9, 2001

(54) CHILD SEAT

(75) Inventor: Isamu Mori, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/286,835

(22) Filed: Apr. 6, 1999

(30) Foreign Application Priority Data

Apr. 9, 1998 (JP) .................................... 10-097643

(51) Int. Cl.[7] .................................. A47C 1/08; B60N 2/26
(52) U.S. Cl. .................................. 297/256.13; 297/250.1; 297/256.16
(58) Field of Search ........................... 297/250.1, 256.13, 297/256.16

(56) References Cited

U.S. PATENT DOCUMENTS

| | | | |
|---|---|---|---|
| 4,729,600 | * | 3/1988 | Single, II et al. .......... 297/256.16 X |
| 4,913,490 | * | 4/1990 | Takahashi .......................... 297/250.1 |
| 4,915,446 | * | 4/1990 | Darling et al. .............. 297/256.13 X |
| 5,106,154 | * | 4/1992 | Kain ................................. 297/256.13 |
| 5,957,531 | * | 9/1999 | Kane et al. ........................ 297/250.1 |

FOREIGN PATENT DOCUMENTS

| | | |
|---|---|---|
| 0 424 303 A2 | 6/1991 | (EP) . |
| 0 431 199 A1 | 6/1991 | (EP) . |
| 0 609 889 A1 | 8/1994 | (EP) . |
| 328889 | 3/1998 | (TW) . |
| WO 95/26279 | 10/1995 | (WO) . |

* cited by examiner

*Primary Examiner*—Anthony D. Barfield
(74) *Attorney, Agent, or Firm*—McGuireWoods LLP

(57) ABSTRACT

In a receive base 3 forming a child seat 1, there is disposed a set angle adjusting mechanism 5 which, in accordance with the angle of a vehicle seat 2, extends a primary rotary plate or the primary rotary plate and a secondary rotary plate simultaneously in a rotating manner to thereby interpose the same between the receive base 3 and vehicle seat 2. According to the present structure, the angle of the receive base 3 can be freely set regardless of the angle of the vehicle seat 2. Also, the set angle adjusting mechanism 5 may be interposed between the receive base 3 and the seat main body of the child seat in such a manner that it in able to adjust the angle of the seat main body. An angle display device is disposed in either of the receive base or seat main body, so that the above-mentioned angle can be confirmed while setting the same. This can enhance the convenience and safety of the child seat to a great extent.

11 Claims, 13 Drawing Sheets

10~15°

10~15°

CHILD SEAT

BACKGROUND OF THE INVENTION

1. Field of the Invention

The present invention relates a vehicle seat for a child generally referred to as a child seat and, in particular, to a child seat which can be set at a desired angle regardless of the angles of a vehicle seat.

2. Description of the Related Art when loading a baby or a little child into a vehicle, sometimes a child Seat is used in order to secure the safety of the baby or child in an emergency such as when applying the brake suddenly. While child seats vary widely in structure, description will be given below of an example of them.

Generally, a child seat 111, as shown in FIG. 23, includes a seat main body 113 in which a baby or a little child 112 is seated, a receiver base 114 which supports the seat main body 113 in such a manner that the seat main body 113 can be rotated freely between a forward facing position and a backward facing position with respect to the advancing direction of the vehicle or the angle of the seat main body 113 can be adjusted freely (that is, the seat main body 113 can be reclined freely), and the like. And, when fixing the child seat 111 to a vehicle seat 115, receiver base 114 is fixed to the vehicle seat 115 by a vehicle seat belt (not shown) or the like.

Especially, for a baby underdeveloped in body, the child seat is mounted backward with respect to the vehicle advancing direction before it is used, in order to hold the baby body through the whole of the back of the baby. On the other hand, for a child developed in body to a certain degree, the child seat is mounted forward with respect to the vehicle advancing direction in order to hold the body of the child through the lower back, abdomen, breast of the child body while the child is seated.

By the way, there is a safety standard for the child seat 111 and, in compliance with the safety standard, a. collision test is conducted o the child seat 111 under the condition of a test seat having a o at surface elevation angle of 3°, as shown in FIG. 23 (its forward facing position) and in FIG. 25 (its backward facing position).

Thus, the angle of the seat main body 113 of the child seat 111 (which includes its inherent angle a and a proper reclining angle b) is set in consideration of the safety and comfort of the little child 112 under the above-mentioned safety standard of the a test seat having a seat surface elevation angle of 3°.

However, the elevation angles of the vehicle seats 115 actually on the market are not always set at the angle of 3° in all vehicles but, as shown in FIG. 24, there are found many vehicles in which the vehicle seats thereof are set about at 15°; that is, in fact, the elevation angles of the vehicle seats vary widely. Thus, in FIG. 23 showing the vehicle seat having an elevation angle of 3°, when an operator is going to set the reclining angle for the angle a and thus to use the child seat 111 in the most-raised position, in actual use, an shown in FIG. 24, the child seat 111 lies on its back side by an excess angle corresponding to the increased angle of the elevation angle of the vehicle seat, that is, by 12°. On the other hand, in FIG. 23 showing the vehicle seat having an elevation angle of 3°, when the operator is going to set the reclining angle for the angle b and thus to use the child seat 111 in the most-lowered position, in the vehicle seat having an elevation angle of 15° shown in FIG. 24, the child seat 111 lies on its back side further by 12°, that is, by the increased angle of the elevation angle of the vehicle seat, with the result that the child seat 111 lies on its back side far beyond the reclining angle b that is set as the most proper angle when the child 111 seat is designed.

In this manner, in the conventional child seat, even if the proper reclining range or angle b is taken into consideration when the child seat is designed, actually, in many cases, the comfort of the child seat cannot be secured.

The above fact also applies similarly to a case shown in FIG. 25 in which the child seat 111 is set backward with respect to the advancing direction of the vehicle. That is, in FIG. 25 showing a vehicle seat having an elevation angle of 3°, normally, the angle of the child seat is set with some room, in particular, for an angle of the order of 50° in the range of the safety standard (the safety standard angle ranges from the vertical direction to an angle of 60°), because a baby who cannot yet hold its head up should be laid down as deep as possible. However, if the child seat 111 is used when the vehicle seat 115 has an elevation angle 15° as shown in FIG. 25, in fact, the child seat 111 is raised up by an angle of 12° corresponding to an increase in the elevation angle although the operator is going to use the child seat 111 in its most-lowered position, which brings the child seat 111 to a state not desirable for the baby who cannot hold its head up.

On the other hand, in the conventional child seats, there are found child seats structured such that the reclining angle thereof can be adjusted in a wide range and, if such child seat is used, it is truly possible to absorb the elevation angle difference between the child seat and vehicle seat. But, when such child seat capable of adjusting the reclining angle in a wide range is used, if the child seat is used backward with respect to the vehicle advancing direction, then, each time the reclining angle is changed, there arises the need to confirm whether the reclining angle after changed is in the range of the safety standard or not, which is troublesome or inconvenient. In addition to this, if the operator should fail to confirm this, not only the comfort of the baby is disturbed but also, when the child seat is lied on its back side beyond the angle of 60° from the vertical direction, in sudden braking or in a collision, there is a danger that the baby can be flown out from the child seat because the reclining angle is not proper.

Also, as means which, each time the reclining angle is changed, confirms whether the angle after changed is in the range of the safety standard or not, there is disclosed a vehicle seat level display device Unexamined in Japanese Patent Publication Hei. 8-20250(PCT/US 91/06419), which displays whether a child seat is set in a proper position or not.

However, since the vehicle seat level display device is not able to make angle adjustments between the child seat and the vehicle seat onto which the child seat is to be mounted, similarly to the previously described case, there arises the need to confirm the angles of the child seat and vehicle seat each time the child seat is mounted.

SUMMARY OF THE INVENTION

The present invention aims at eliminating the drawbacks found in the above-mentioned conventional child seats and devices.

Accordingly, it is an object of the invention to provide a child seat which not only can make angle adjustments between a child seat and a vehicle seat to which the child seat is to be mounted, regardless of the elevation angle of the vehicle a seat, but also can view the adjusting angles visually.

In attaining the above object, according to the present invention, there is provided a child seat of a reclining type or a non-reclining types which is composed of only a seat main body or a seat main body and a receive base for receiving the seat main body thereon, and also which is to be Bet on a vehicle seat, provided by a set angle adjusting mechanism for adjusting the set angle of the seat main body with respect to said vehicle seat.

Also, according to the present invention in the above-mentioned child seat, the set angle adjusting mechanism is disposed in the contact portion of the seat main body where the seat main body is to be contacted with the vehicle seat.

Further, according to the present invention in above-mentioned child seat, the set angle adjusting mechanism is interposed between the seat main body and receive base and/or is disposed in the contact portion of the receive base where the receive base in to be contacted with the vehicle seat.

According to the present invention in above-mentioned child seat, the set angle adjusting mechanism comprises a primary rotary plate rotatably stored in a recessed portion formed in the bottom portion of the child seat, a secondary rotary plate disposed in the primary rotary plate in such a manner that one end portion thereof can be rotated, and a securing portion formed within the above-mentioned recessed portion for securing the other end portion of the secondary rotary plate.

And, according to the invention in above-mentioned child seat, the child seat further includes an angle display device for displaying whether the inclination angle of the child seat in proper or not.

Also, according to the invention in above-mentioned child seat, there is provided a child seat which comprises an angle display device for displaying whether the inclination angle of the child seat is proper or not.

Further, according to the invention in above-mentioned child, the proper inclination angle of the child seat in set in the angle range of 35°–55° with respect to a vertical line.

As described above, according to the invention, since the set angle adjusting mechanism is disposed in the child seat, when setting the child seat on the vehicle seat, the set angle of the child seat can be adjusted by the set angle adjusting mechanism and, therefore, even if the elevation angle of the vehicle seat is, for example, about 15°, the angle of the seat main body can be set similarly to a vehicle seat which has an elevation angle of 3°. Accordingly, after the child seat is set in the above-mentioned manner, when the child seat is a child seat of a non-reclining type, the child seat can be used within a given safety standard range; and, in the case of a child seat of a reclining type, the child seat may be used according to the reclining angles that are set an the proper angles when the child seat is designed. In the conventional child seat, each time the reclining angle of the child seat is changed, it is necessary to confirm whether the angle after changed is in the safety standard range or not. That is, according to the invention, there in eliminated the need for such confirmation as in the conventional child seat.

Also, since the angle display device is disposed in the child seat, in the above-mentioned angle adjusting operation, the angle of the child seat can be adjusted while observing the angle visually, which can enhance the convenience of the child seat.

DETAILED DESCRIPTION OF THE PREFERRED EMBODIMENTS

Now, description will be given below of preferred embodiments of a child seat according to the invention with reference to FIGS. 1 to 22. For reference, in describing the embodiments of a child seat according to the invention, at first, description will be given of the outlines of various child seats respectively incorporating therein a set angle adjusting mechanism according to the invention with reference to FIGS. 1 to 5 and, after then, description will be given of the structures and operations of the set angle adjusting mechanism and the like according to the invention with reference to FIGS. 6 to 22.

Figure 1:
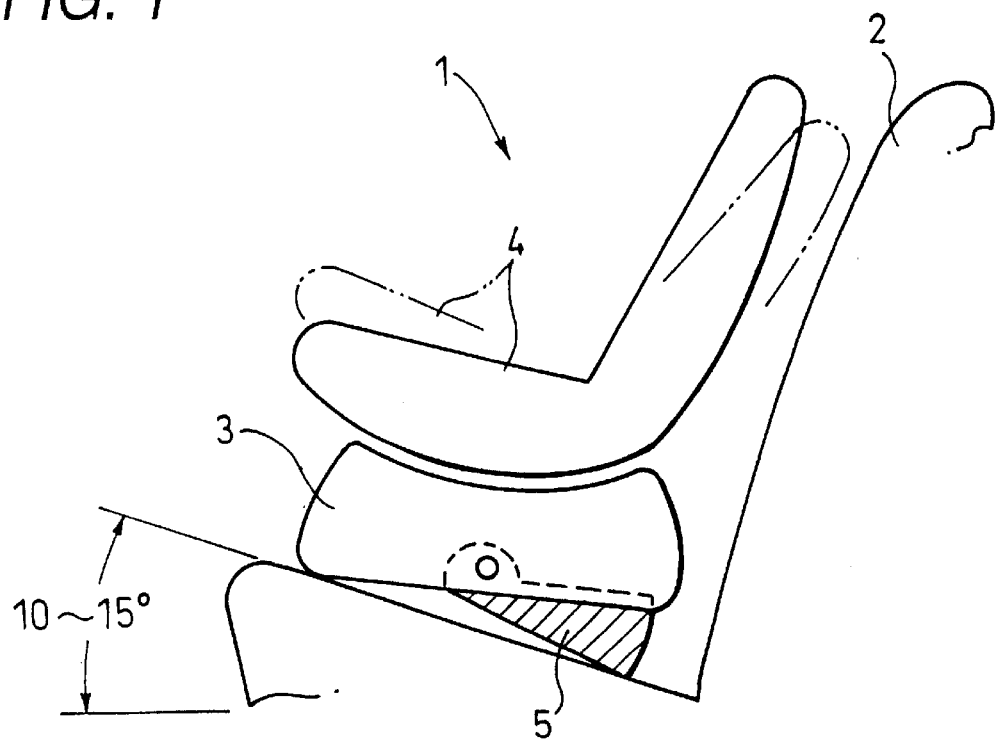
FIG. 1 is a typical side view of a child seat of a reclining type and a first embodiment of a set angle adjusting mecha-nism according to the invention, showing a state in which the latter is disposed the former.
Figure 2:
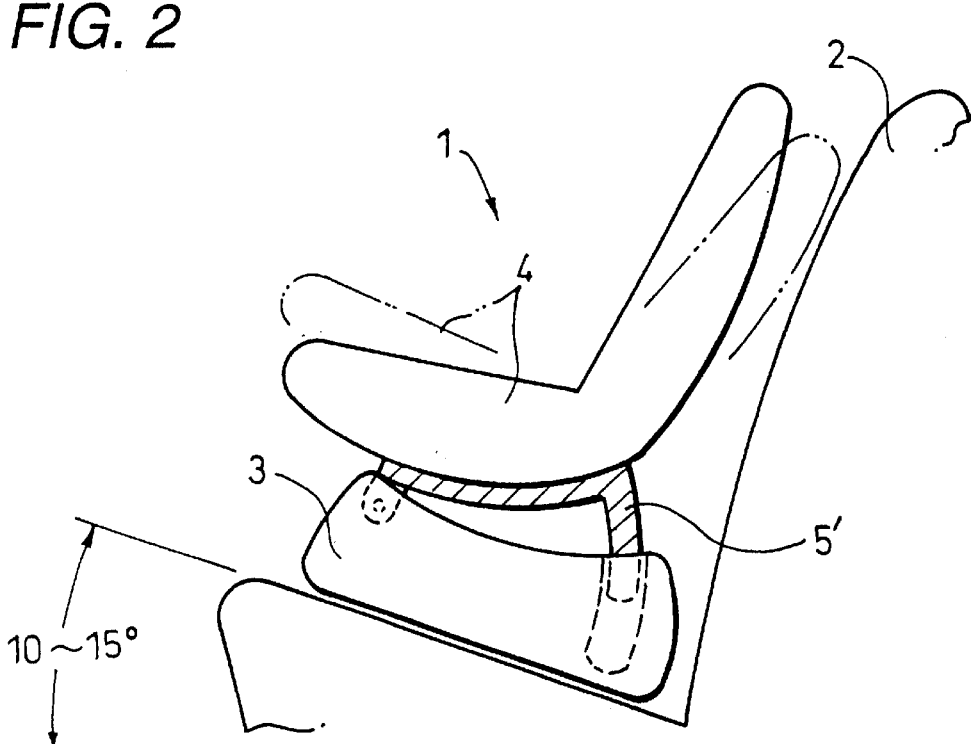
FIG. 2 is a typical side view of a child seat of a reclining type and a second embodiment of a set angle adjusting mechanism according to the invention, showing a state in which the latter is disposed in the former.
Figure 3:
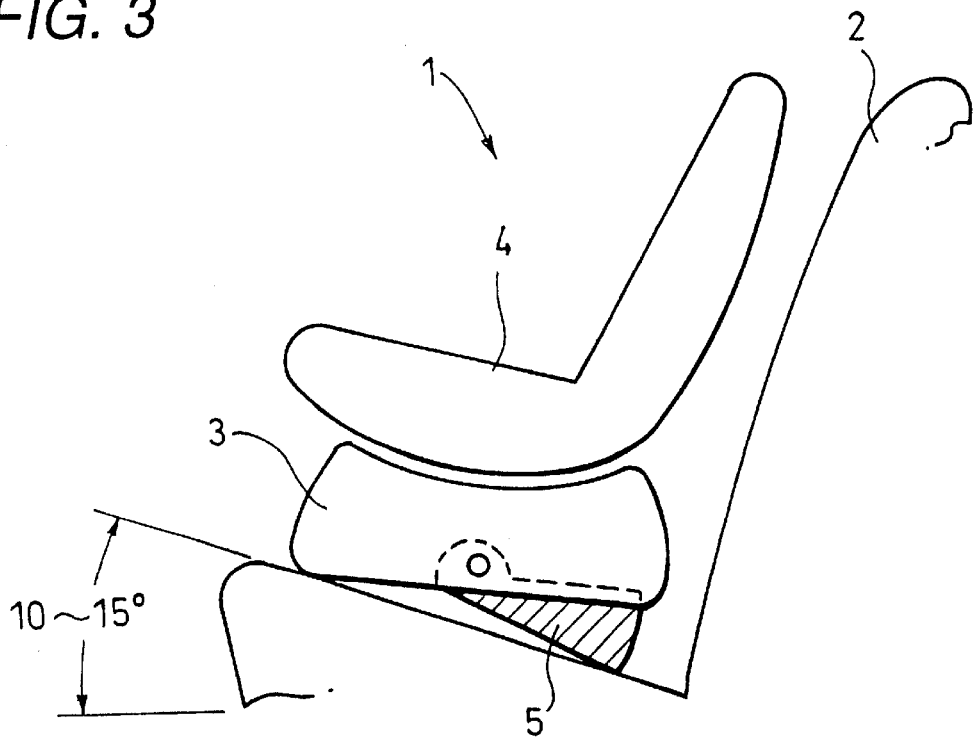
FIG. 3 in a typical side view of a child seat of a non-reclining type and a first embodiment of a set angle adjusting mechanism according to the invention, showing a state in which the latter is disposed in the former.
Figure 4:
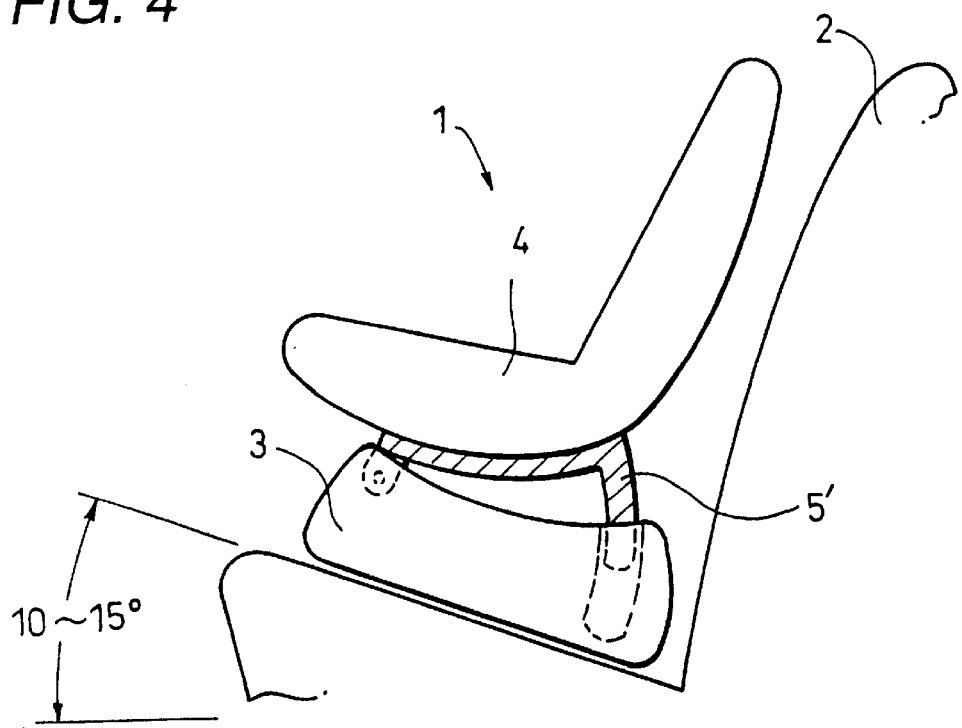
FIG. 4 is a typical side view of a child seat of a non-reclining type and a second embodiment of a set angle adjusting mechanism according to the invention, showing a state in which the latter is disposed in the former.
Figure 5:
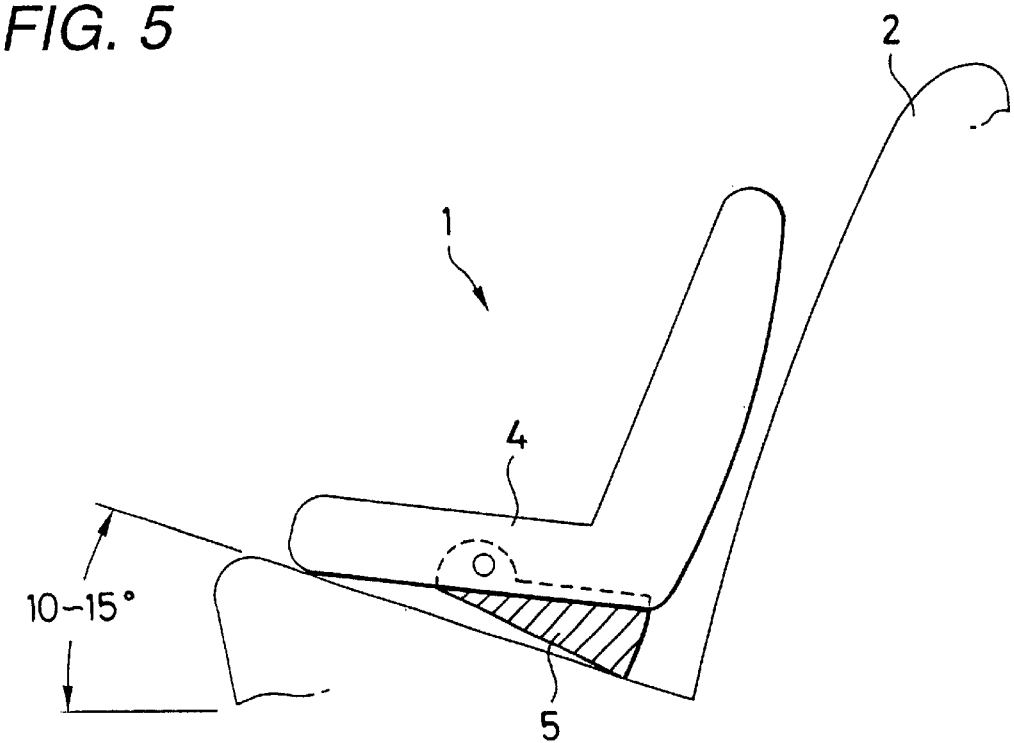
FIG. 5 in a typical side view of a child seat composed of only a seat main body and a first embodiment of a set angle adjusting mechanism according to the invention, showing a state in which the latter is disposed in the former.

Now, FIGS. 1 to 5 respectively shows, in a typical manner, child seats 1 which respectively incorporate therein a set angle adjusting mechanism according to the invention. In particular, the child seats 1 shown in FIGS. 1 to 4 are respectively different in structure from the child seat shown in FIG. 5; that is, the former is composed of a seat main body 4 and a receive base 3 for receiving the seat main body 4, whereas the child seat 1 shown in FIG. 5 is composed of only a seat main body 4. Also, in more particular, the child seats 1 shown in FIGS. 1 and 2 are respectively child seats of a so called reclining type that it can be rotated between the seat main body 4 and receive base 3 thereof, whereas the child seats shown in FIGS. 3 and 4 are respectively child seats of a so called non-reclining type that it cannot be rotated between the seat main body 4 and receive base 3 thereof. And, a set angle adjusting mechanism 5 or 5' according to the invention is incorporated in common in all child seats 1 respectively shown in FIGS. 1 to 5. The present invention can apply to a child seat of a reclining type that it is composed of a seat main body and a receive base, to a child Beat of a non-reclining type that it is composed of a seat main body and a receive base, and a child seat of a type that it is composed of only a seat main body.

Now, in FIG. 1 in which a child seat 1 is composed of a receive base 3 to be installed on a vehicle seat 2 and a seat main body 4 to be received by the receive base 3 in a reclinable manner, there is disposed a set angle adjusting mechanism 5 according to the invention in the contact portion of the seat main body 4 of the child seat 1 where the seat main body 4 is to be contacted with the vehicle seat 2. In this manner, since there is disposed in the child seat 1 the set angle adjusting mechanism 5 which is capable of adjusting the angle of the receive base 3 with respect to the vehicle seat 2, when the angle of the vehicle seat 2 is set for a steep angle, for example, in the angle range of 10°–15°, the rear end side of the receive base 3 may be raised up by the set angle adjusting mechanism 5 and the angle of the child seat 1 may be adjusted to be lower than or equal to 10°.

On the other hand, in FIG. 2 in which a child seat 1 is composed of a receive base to be installed on a vehicle seat 2 and a seat main body 4 to be received by the receive base 3 in a reclinable manner, there is interposed a set angle adjusting mechanism 5' according to the invention between the seat main body 4 and receive base 3 of the child seat 1. Therefore, when the angle of the vehicle seat 2 is set for a steep angle, for example, in the angle range of 10°–15°, the rear end side of the seat main body 4 may be raised up by the set angle adjusting mechanism 5 and the angle of the child seat 1 may be then adjusted to be lower than or equal to 10°.

The principles of the set angle adjusting mechanisms 5 and 5' employed in the child seats 1 of a reclining type respectively shown in FIGS. 1 and 2 can be applied quite similarly to the child seats 1 of a non-reclining type respectively shown in FIGS. 3 and 4. That is, in FIG. 3, in the contact portion of the seat main body 4 of the child seat 1 where the seat main body 4 is to be contacted with the vehicle seat 2, there is disposed the set angle adjusting mechanism 5 according to the invention. In this case as well, when the angle of the vehicle seat 2 is set for a steep angle, for example, in the angle range of 10°–15°, the rear end side of the receive base 3 may be raised up by the set angle adjusting mechanism 5 and the angle of the child seat 1 may be then adjusted to be lower than or equal to 10°.

Also, in FIG. 4, between the seat main body 4 and receive base 3 of the child seat 1, there is interposed the set angle adjusting mechanism 5' according to the invention. Similarly, when the angle of the vehicle seat 2 is set for a steep angle, for example, in the angle range of 10°–15°, the rear end side of the seat main body 4 may be raised up by the set angle adjusting mechanism 5 and the angle of the child seat 1 may be then adjusted to be lower than or equal to 10°.

And, in the child seat 1 which is shown in FIG. 5 and is composed of only the seat main body 4, in the contact portion of the seat main body 4 thereof where the seat main body 4 is to be contacted with the vehicle seat 2, there in disposed the set angle adjusting mechanism 5 according to the invention. In this case as well, when the angle of the vehicle seat 2 is set for a steep angle, for example, in the angle range of 10°–15°, the rear end side of the receive base 3 may be raised up by the set angle adjusting mechanism 5 and the angle of the child seat 1 may be then adjusted to be lower than or equal to 10°.

As has been described hereinbefore, the present invention can be applied to a child seat of every type whether it is of a reclining type or of a non-reclining type, or whether it includes a receive base or not.

Next, description will be given below of several embodiments of the concrete structure of a set angle adjusting mechanism according to the invention.

First Embodiment

Figure 6:
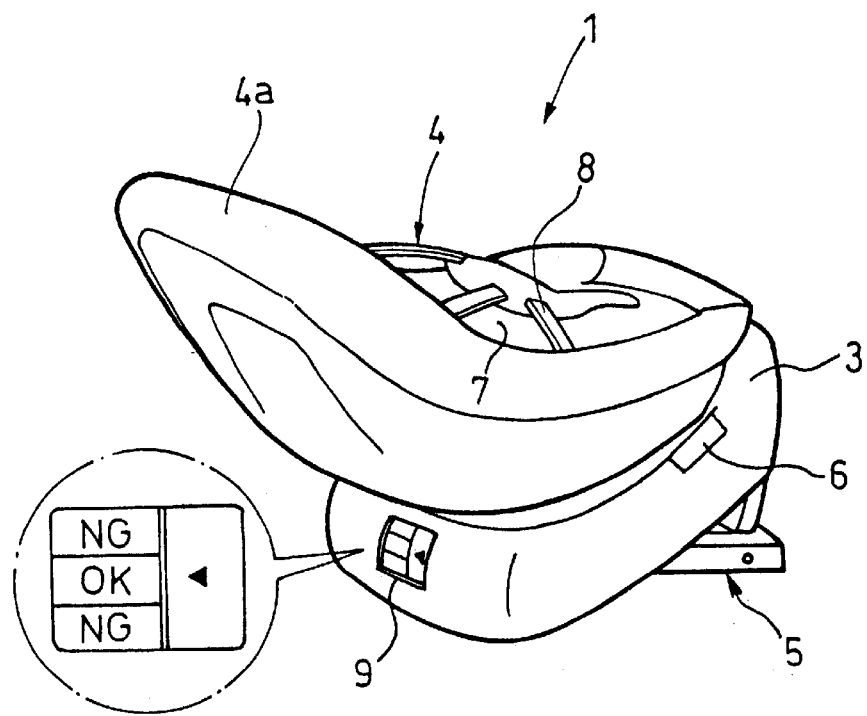
FIG. 6 is a perspective view of a child seat, showing the structure thereof.

At first, description will be given below of a first embodiment of the concrete structure of a set angle adjusting mechanism according to the invention with reference to FIGS. 6 to 11. In FIG. 6, there is shown a child seat 1 in which a seat main body 4 is rotatably mounted on the upper portion of a receive base 3. In the upper portion of the receive base 3, there is formed a belt groove 6; and, in particular, a vehicle seat belt (not shown) provided in a vehicle seat (not shown) is wound through this belt groove 6 and is thereby fixed to the vehicle seat. The upper portion of the seat main body 4 is structured an a baby seat 7 and, in the baby seat 7, there is provided a vehicle seat belt 8 which is used to prevent the baby from flying out from the baby seat 7.

And, on the lower surface of the receive base 3, there is disposed the set angle adjusting mechanism 5 and, on the front surface of the receive base 3, there is provided an angle display device 9. By the way, FIG. 6 shows a state in which the seat main body 4 is rotated and a seat back portion 4a thereof is thereby positioned on the front surface side of the receive base 3.

The angle display meter 9 is arranged such that it displays "OK" when the receive base 3 is set at a proper angle, whereas it displays "NG" (no good) when the receive base 3 is not set at a proper angle. However, alternatively, the angle display device 9 may also be arranged such that it can display expressions such as "Usable", "No Use", and the like, or it can display colors such as red, green and the like. Also, the mounting position of the angle display device 9 is not limited to the position that is shown in FIG. 6, but it may also be mounted on the back surface of the seat back portion 4a or the like. By the way, with regard to the angle display device 9, description will be given later in detail of the embodiments thereof with reference to FIGS. 15 to 22.

Figure 10:
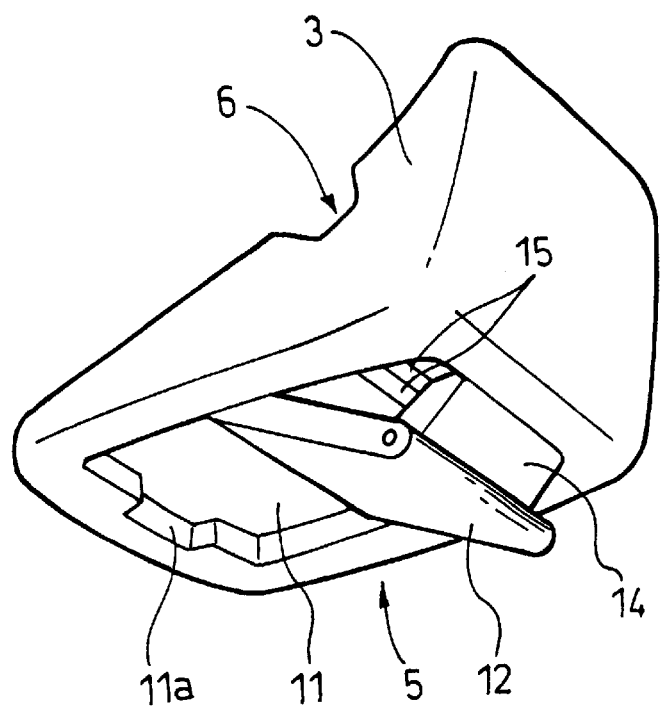
FIG. 10 is a perspective view of the receive base, showing the rotating operation of a secondary rotary plate.
Figure 11:
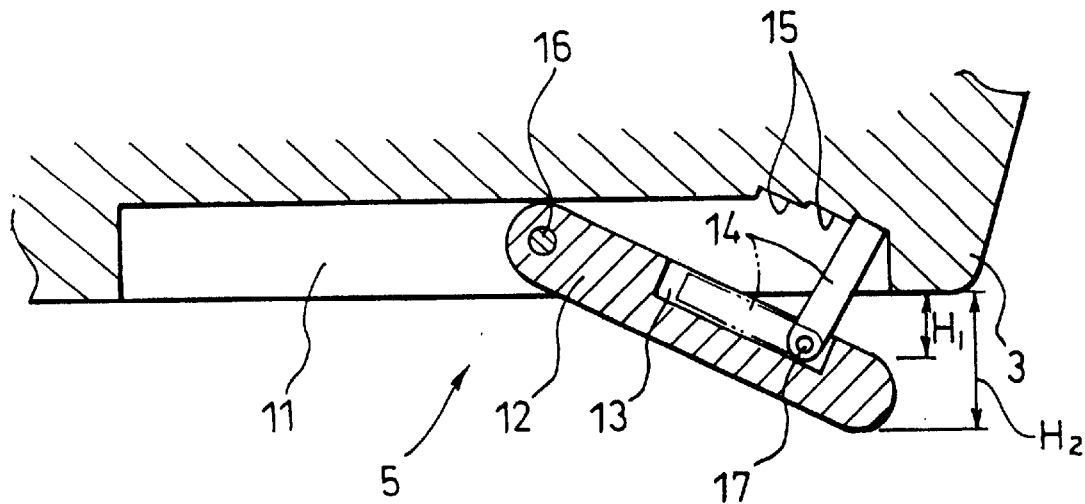
FIG. 11 is a section view of the main portions of the receive base, showing rotating operation of the secondary rotary plate.

The set angle adjusting mechanism 5 to be employed in the invention comprises a primary rotary plate 12 which is disposed within a rectangular-shaped recessed portion 11 formed in the lower portion of the receive base 3 in such a manner that it can be rotated to a forward position (a position shown in FIG. 7) and to a backward portion (a position shown in FIG. 8) with part of the two side surfaces of the recessed portion 11 as a fulcrum thereof; a secondary rotary plate 14 which has such a cross section as shown in FIG. 11 and, when not in use, is stored within a recessed portion 13 (as shown by an imaginary line in FIG. 11) formed in the primary rotary plate 12, and also which, when the inclination angle of the vehicle seat is too large to be adjusted to a proper angle only by the primary rotary plate 12, can be used as shown in FIG. 10; and, a stepped securing portion 15 which is used to secure the secondary rotary plate 14.

Figure 9:
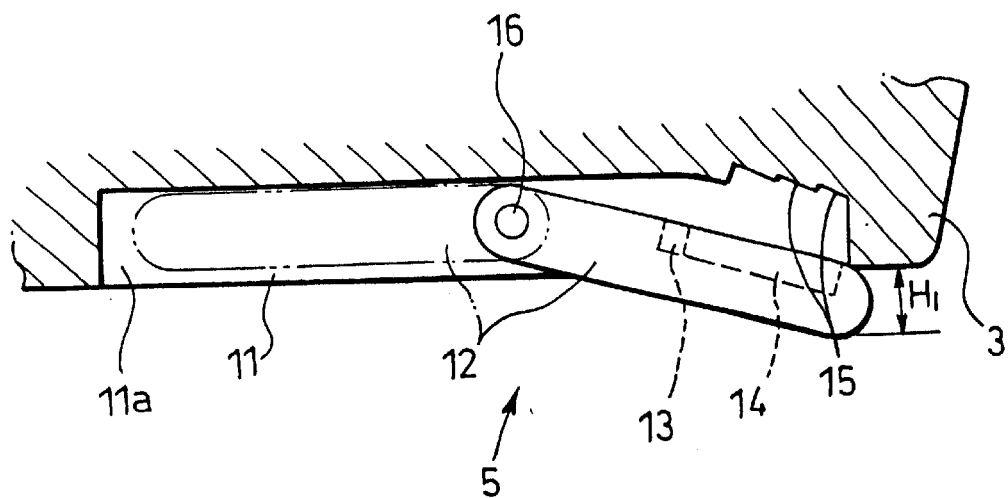
FIG. 9 is a section view of the main portions of the receive base, showing the rotating operation of the primary rotary plate.

On the two sides of the end portion of the primary rotary plate 12, as shown in FIGS. 9 and 11, there in disposed a support shaft 16 which is journaled in holes (not shown) respectively formed in the two sides of the substantially central portion of the recessed portion 11. On the other hand, on the two sides of the end portion of the secondary rotary plate 14, as shown in FIG. 11, there is disposed a support shaft 17 which is journaled in holes (not shown) respectively formed in the two sides of the end portion of the recessed portion 13 formed in the primary rotary plate 12.

Also, the securing portion 15 is formed in the recessed portion 11 as a plurality of steps in such a manner that it is able to adjust one end of the secondary rotary plate 14 to a desired angle.

Next, description will be given below of an angle adjusting operation to be executed by the set angle adjusting mechanism 5.

Figure 7:
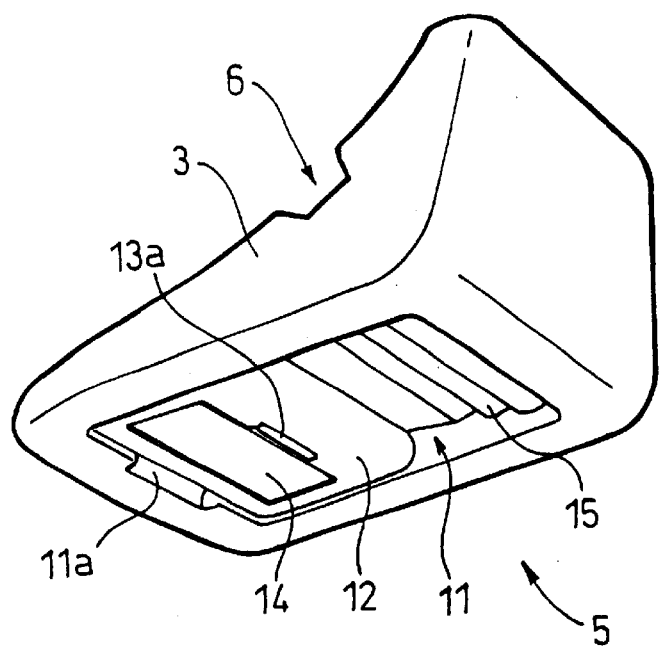
FIG. 7 is a perspective view of the bottom surface of a receive base, showing a first embodiment of a set angle adjusting mechanism according to the invention.
Figure 8:
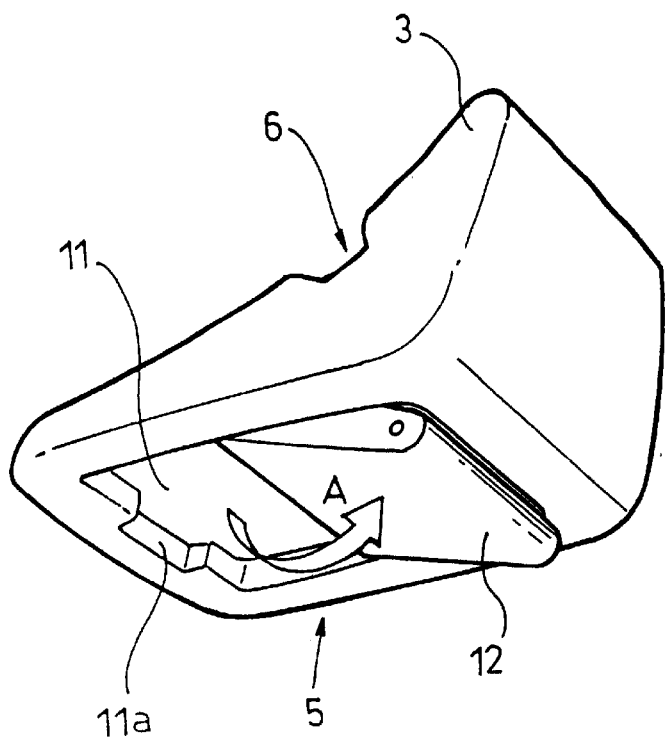
FIG. 8 is a perspective view of the receive base, showing the rotating operation of a primary rotary plate.

In a state in which the angle adjustments are not made, as shown in FIG. 7, the primary rotary plate 12 is stored within the recessed portion 11 of the receive base 3, while the secondary rotary plate 14 is stored within the recessed portion 13 of the primary rotary plate 12. Therefore, in this state, it can well be said that the bottom surface of the receive base 3 shows a substantially flat plate shape, although the rear half section of the recessed portion 11 is opened; and thus, when the receive base 3 as it is fixed to the vehicle seat 2, the bottom surface of the receive base 3 is stable and thus the receive base 3 can be fixed to the vehicle seat 2 in a stable manner.

By the way, the primary rotary plate 12 is secured to the recessed portion 11 by suitable means such as by engagement between a securing projection and a securing hole or the like in such a manner that the primary rotary plate 12 can be freely secured to and removed from the recessed portion 11; and, therefore, unless it is pulled out specially, the primary rotary plate 12 is prevented from removing from the recessed portion 11. Also, the secondary rotary plate 14 is similarly secured to the recessed portion 13 in such a manner that it can be freely secured to and removed from the recessed portion 13; and, therefore, in the state shown in FIG. 7, the secondary rotary plate 14 is prevented against removal from the recessed portion 13.

On the other hand, when making a first-stage angle adjustment, the fingertips are inserted into an operation portion 11a formed in one end of the recessed portion 11 and the primary rotary plate 12 is pulled out downwardly in FIG. 7 while gripping the end portion thereof. As a result of this, the secured condition between the primary rotary plate 12 and recessed portion 11 is removed, and the primary rotary plate 12 is then rotated in such a manner an shown by an arrow in FIG. 8 so that the end portion of the primary rotary plate 12 is positioned on the lower side of the receive base 3.

If this state is shown in the form of the section structure of the associated components, as shown in FIG. 9, the primary rotary plate 12 is positioned on the lower side of the rear end portion (in FIG. 9, the right end portion) of the receive base 3, while the rear end portion of the receive base 3 is lifted up by an amount corresponding to the thickness of the primary rotary plate 12. Thus, the angle of the receive base 3 with respect to the vehicle seat 2 can be adjusted according to the lift height H1 of the receive base 3.

If the first-stage angle adjustment in found proper, then an arrow provided in the angle display meter 9 shows "OK" but, if the angle adjustment is found insufficient, then "NG" will be displayed. In the case of "OK," the vehicle seat belt is wound into the belt grooves 6 of the receive base 3 to thereby fix the receive base to the vehicle seat 2. On the other hand, in the case of "NG", the operation is transferred to a second-stage angle adjustment which will be discussed below.

Here, desirably, the proper angles of the vehicle seat with respect to the vertical line may be in the range of 35°–55°; more desirably, in the range of 38°–50°; and, most desirably, in the range of 45°–50°.

That is, when the angle of the receive base cannot be adjusted to the desired angle only by the above-mentioned first-stage angle adjustment, the fingertips are inserted into an operation portion 13a formed in one end of the recessed portion 13 of the primary rotary plate 12 and, with the end portion of the secondary rotary plate 14 gripped by the fingertips, the secondary rotary plate 14 is made to rise up from the recessed portion 13, so that the leading end portion of the secondary rotary plate 14 is secured to the desired position of the secured portion 15 as shown in FIGS. 10 and 11.

When this state is shown in the form of a section structure, as shown in FIG. 11, the primary rotary plate 12 is pressed downwardly by the secondary rotary plate 14 and thus the distance between the primary rotary plate 12 and receive base 3, that is, the lift height of the receive base 3 is increased from H1 to H2, so that the rear end portion of the receive base 3 is lifted up correspondingly to the height H2. Therefore, the angle of the receive base 3 with respect to the vehicle seat 2 can be adjusted correspondingly to the lift height H2.

According to the present structure, even when the elevation angle of the seat surface of the vehicle seat 2 is about 15°, if the present angle adjustment operation is executed, then the angle of the receive base 3 can be set similarly to the vehicle seat 2 which has a seat surface elevation angle of 3°. And, since the primary rotary plate 12 is formed wide in the plate width thereof, the receive base 3 can be fixed onto the vehicle seat 2 in a stable manner. Also, because the vehicle seat 2 is generally a cushion seat, the receive base 3 will sink in the vehicle seat 2; however, if the contact area of the receive base 3 to be in contact with the vehicle seat is set as large as possible, then the stress can be reduced, that is, the sinking of the receive base 3 can be minimized. On the other hand, even when the receive base 3 sinks to a certain degree since the vehicle seat 2 is a cushion seat, with use of the present structure, the angle of the receive base 3 can be adjusted with the sinking of the receive base 3 taken into consideration.

Also, as shown in FIG. 6, since there is provided the angle display device 9, the angle of the receive base 3 can be adjusted while observing visually whether the angle of the receive base 3 is in the proper angle range or not.

By the way, according to our experiments, assuming that, when the above-mentioned set angle adjusting mechanism 5 is not used, the angle of the receive base is set for an angle of 0°, when the angle of the receive base 3 was adjusted by the primary rotary plate 12, the angle could be adjusted to about 5° and, when the angle of the receive base 3 was adjusted by the secondary rotary plate 14, the angle could be adjusted to about 10°. However when the vehicle seat 2 is a cushion seat, sometimes, the adjusted angles were about 4° and 7 to 8°, respectively.

And, in the above description, the securing portion 15 is formed in a plurality of steps; however, it is not always necessary to form the securing portion 15 in a plurality of steps but the securing portion 15 may be formed of a single step.

Second Embodiments

Next, description will be given below of a second embodiment of a set angle adjusting mechanism 5 according to the invention with reference to FIG. 12. Here, a set angle adjusting mechanism 5 according to the second embodiment is structured such that, by rotating an operation knob 21 provided on the front portion of the receive base 3, the angle of the receive base with respect to a vehicle seat (not shown) can be adjusted. That is, in the interior portion of the receive base 3, there is an idly rotatable screw rod 23 which is journaled on the rear wall 3b of the receive base 3 by a bearing member 22, while the above-mentioned operation knob 21 is fixed to the leading end of the screw rod 23. And, with the screw rod 23, there is threadedly engaged a movable body 24 including a lower side surface which, when viewed from the side surface thereof, is formed as an inclined surface.

Also, in the interior portion of the receive member 3, there is disposed a rotary member 26 which is capable of rotating about a bearing member 25 formed in the bottom portion of the receive base 3. Referring in particular to the structure of the rotary member 26, the forward portion thereof that is located on the forward side of the receive base 3 is formed smaller in thickness, the backward portion thereof is formed larger in thickness, and, in the central portion thereof, there is formed a slit 27 through which the screw rod 23 can be inserted. However, in spite of the formation of the slit 27, the forward portion of the rotary member 24 is formed as an integral body and thus the whole rotary member 24 rotates about the bearing member 25 as a single member. Also, the rotary member 26 is normally energized by a coil spring (not shown) in a direction where it can be contacted with the movable body 24.

Figure 12:
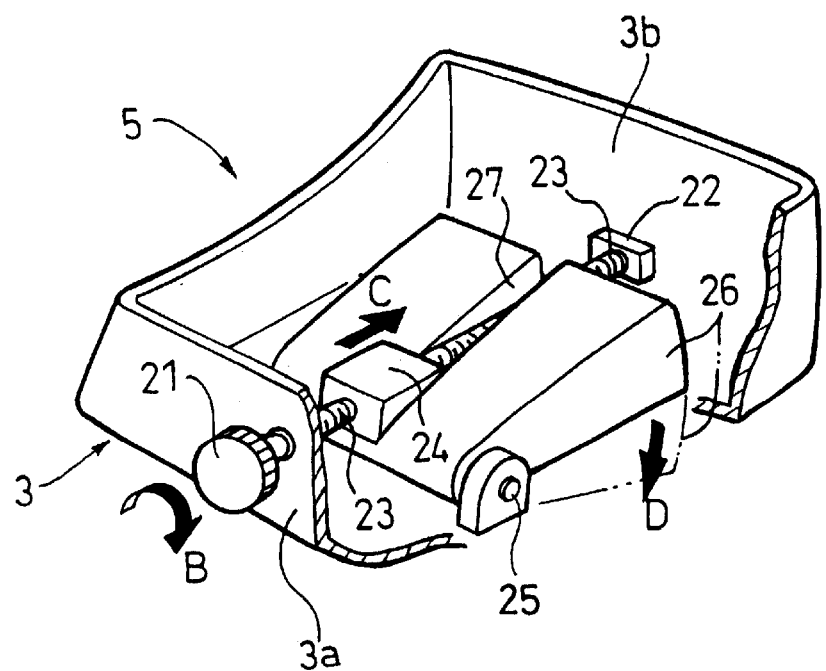
FIG. 12 is a perspective view of the second embodiment of a set angle adjusting mechanism according to the invention.

According to the above-mentioned structure, if the operation knob 21 is rotated, for example, in the direction of an arrow B shown in FIG. 12, then the screw rod 23 is rotated integrally with the operation knob 21 and the movable body 24 is caused to move in the direction of an arrow C shown in FIG. 12. That is, because the lower side surface of the movable body 24 is formed as an inclined surface and is in contact with the surface of the rotary member 26, the rotation of the movable body 24 itself is prevented by the rotary member 26. Therefore, by rotating the screw rod 23, the movable body 24 is caused to advance in the arrow C direction and, with the advancement of the movable body 24, the movable body 24 presses against the rear end side of the rotary member 26. As a result of this, the rotary member 26 is caused to rotate in such a manner as shown by an arrow D in FIG. 12, the rear end side of the rotary member 26 is caused to project from a position shown by a solid line into the lower portion of the receive base 3 as shown by an imaginary line, and the rear side of the receive base 3 is lifted up correspondingly to the projecting height of the rear end side of the rotary member 26, so that the angle of the receive base 3 can be adjusted.

According to the present structure, by operating or rotating the operation knob 21, the angle of the receive base 3 can be adjusted not only in a continuously variable manner but also in the range of minute angles. Also, the angle of the receive base 3 can be adjusted while the receive base 3 is left set on the vehicle seat. That is, the present structure is very convenient.

Third Embodiment

Next, description will be given below of a third embodiment of a set angle adjusting mechanism 5 according to the invention with reference to FIG. 13. Here, a set angle adjusting mechanism 5 according to the third embodiment is structured such that, by pulling out an operation knob 31 provided on the front surface of the receive base 3, the angle of the receive base 3 with respect to a vehicle seat can be adjusted. That is, in the bottom portion of the receive base 3, there is disposed a bearing member 32, a movable rod 33 is inserted through the bearing member 32, one end of the movable rod 33 is inserted through the front wall 3a of the receive base 3, and the operation knob 31 is mounted on the leading end of the movable rod 33. And, a ring-shaped securing member 34 is fixed to the movable rod 33 and, between the securing member 34 and the front wall 3a of the receive base 3, there is interposed a spring 35 in such a manner that it is fitted over wound around the movable rod 33. Therefore, the movable rod 33 is always energized toward the backward side of the receive base 3 by the energizing force of the spring 35.

Also, the rear end of the movable rod 33 is fixed to the substantially central portion of a securing member 36 which is formed in a forked shape. The two ends of the securing member 36 are respectively formed in an acute angle, while the acute-angle formed portions of the securing member 36 respectively form securing pawls 37a and 37b.

On the other hand, on the front side of the bottom portion of the receive base 3, there are disposed a pair of bearing members 38a and 38b which are spaced at a given interval from each other, while the respective one-end portions of rotary members 39a and 39b are rotatably journaled on the bearing members 38a and 38b. The rotary members 39a and 39b, when viewed from the side surfaces thereof, respectively show sickle shapes: in particular, the leading ends thereof that correspond to the hafts of the sickles are journaled on the bearing members 38a and 39b, respectively; and, in the portions thereof that correspond to the blades of the sickles, there are formed securing pawls 40a and 40b respectively. By the way, although not shown in FIG. 13, in the bottom portion of the receive base 3, in more particular, in the lower portions of the haft portions of the rotary members 39a and 39b, there is formed an opening through which the rotary members 39a and 39b can inserted.

Figure 13:
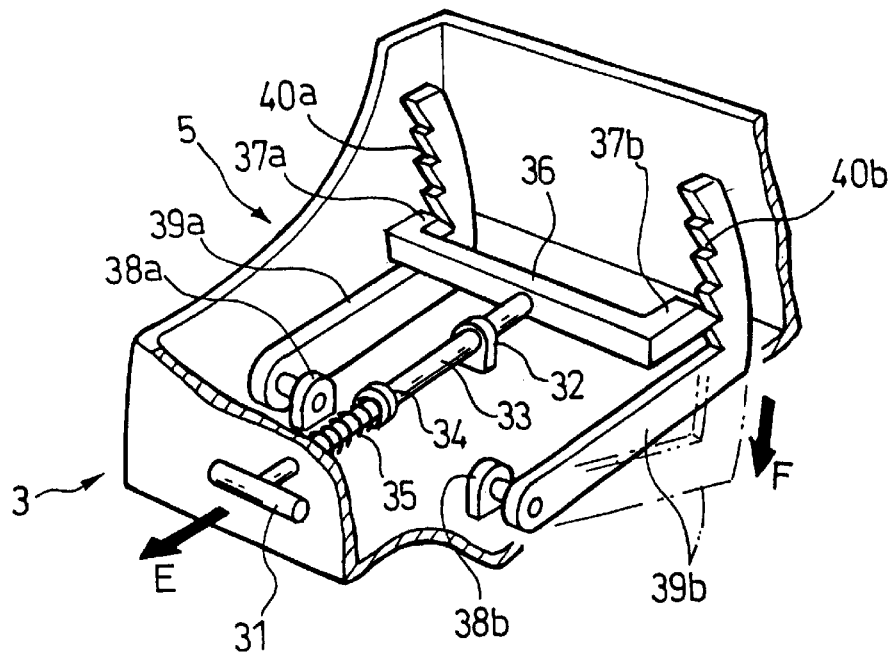
FIG. 13 is a perspective view of a third embodiment of a set angle adjusting mechanism according to the invention.

According to the above-mentioned structure, by pulling out the operation knob 31 in the direction of an arrow E shown in FIG. 13, the secured condition between the securing pawls 37a, 37b and the securing pawls 40a, 40b of the rotary members 39a, 39b is removed, so that the rotary members 39a and 39b are allowed to fall down. However, since the leading ends of the rotary members 39a and 39b are supported by the bearing members 38a and 38b, actually, the rotary members 39a and 39b are rotated from their position shown by solid lines in FIG. 13 in such a manner as shown by imaginary line in FIG. 13, so that they respectively project onto the lower side surfaces of the receive base 3. Therefore, similarly to the previously described structure, the rear end side of the receive base 3 can be raised up with respect to the vehicle seat, so that the angle of the receive base 3 can be adjusted properly.

According to the present structure as well, the angle of the receive base 3 can be adjusted little by little, and the rotary members 39a and 39b can be stored into the receive base 3 simply by pulling the operation knob 31 while the receive base 3 is left set on the vehicle seat.

While several embodiments of the set angle adjusting mechanism 5 according to the invention have been described hereinabove, the above-described embodiments are all structured in such a manner an to execute the angle adjusting operation shown in FIG. 1, that is, they are all used to adjust the angle of the receive base 3 with respect to the vehicle seat 2. However, the invention is not limited to the above but, according to the invention, as shown in FIG. 2, there can also be provided such a structure that can adjust the angle of the seat main body 4 with respect to the receive base 3. Therefore, description will be given below of, as a fourth embodiment according to the invention, a set angle adjusting mechanism 5 which is structured in such a manner that it can adjust the angle of the seat main body 4 with respect to the receive base 3.

Fourth Embodiment

Figure 14:
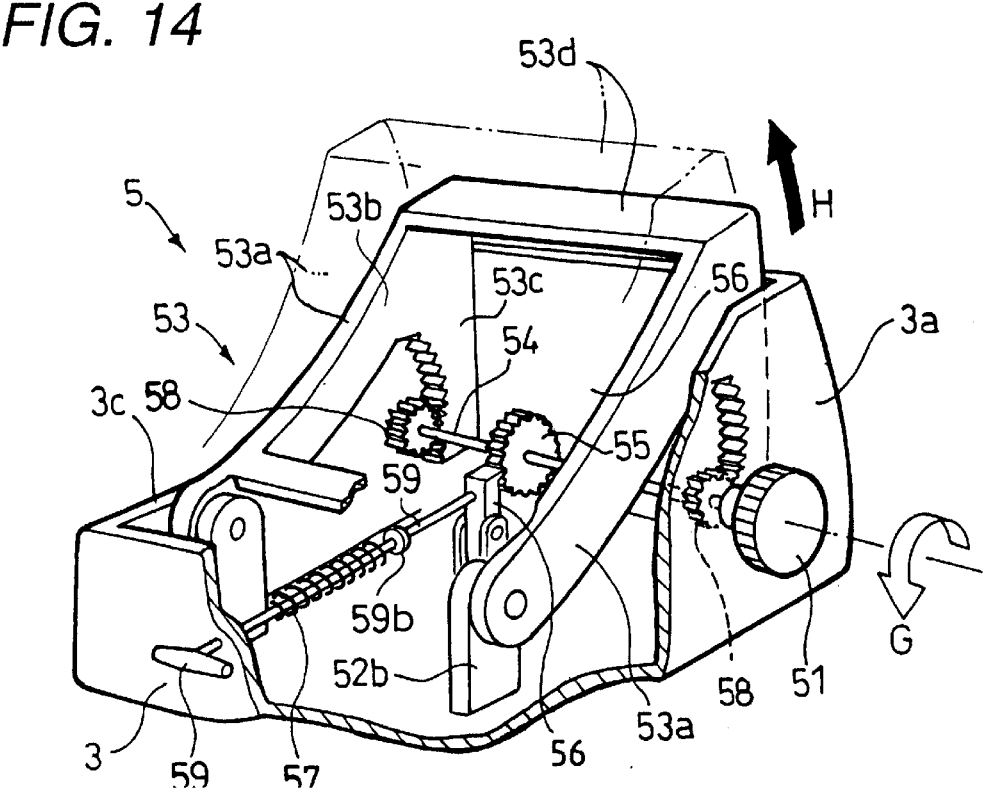
FIG. 14 is a perspective view of a fourth embodiment of a set angle adjustment mechanism according to the invention.

A set angle adjusting mechanism 5 according to the fourth embodiment of the invention, as shown in FIG. 14, is structured such that, by rotating an operation knob 51 provided on the side surface of the receive base 3, the angle of the seat main body 4 with respect to the vehicle seat 2 can be adjusted (see FIG. 2). That is, in the bottom portion of the receive base 3, there are disposed a pair of support members 52a and 52b which are spaced at a given interval from each other, while the end portion of a rotary member 53 is rotatably supported on the two support members 52a and 52b. The rotary member 53 comprises a pair of support portions 53a with their respective one-end portions supported on the support members 52a and 52b, a pair of projecting portions 53c respectively having tooth portions 53b formed on their respective side surfaces, and a connecting member 53d for connecting the pair of right and left support portions 53a with their associated projecting portions 53c. Here, the tooth portions 53b are respectively formed on arc lines in compliance with the moving locus of the rotary member 53.

On the other hand, a rotary shaft 54 is rotatably supported by the left and right side walls 3c and 3d of the receive base 3, while the above-mentioned operation knob 51 is mounted on one end of the rotary shaft 54. At the proper positions of the rotary shaft 54, there are disposed gears 58, 58 which can be meshed or engaged with the tooth portions 53b. Further, a ratchet wheel 55 is fixed to the substantially central portion of the rotary shaft 54, while a securing member 56 to be secured to and removed from the ratchet wheel 55 is swingably disposed on the support portion of the receive base 3. To the securing member 56, there is pivotally mounted an operation rod 59 which extends through the receive base 3. Further, the operation rod 59 includes a flange 59b provided at a proper position thereof and, between the flange 59b and the inner wall of the receive base 3, there is interposed a spring 57. The spring 57 in always energizing the operation rod 59 in a direction where the ratchet wheel 55 and securing member 56 can be engaged with each other.

According to the above-mentioned structure, by rotating the operation knob 51, for example, in the direction of an arrow G shown in FIG. 14, then the rotary shaft 54, ratchet wheel 55 and gears 58 are rotated integrally in the same direction. And, because the gears 58 are in meshing engagement with the tooth portions 53b, the rotary member 53, as a whole, is raised from its position shown by a solid line in FIG. 14 in such a manner as shown by an imaginary line in FIG. 14 to thereby lift the seat main body (not shown) in such a manner as previously explained with reference to FIG. 2, so that, in this case, the angle of the seat main body can be adjusted with respect to the receive base 3. By the way, after the angle of the seat main body is adjusted to a desired angle, if the rotation of the operation knob 51 is stopped, then the gears 58 are prevented against rotation by the above-mentioned ratchet mechanism, so that the desired lift position of the seat main body can be fixed.

On the other hand, to lower the rotary member 53, a handle 59 may be pulled to thereby remove the engagement between the ratchet wheel 55 and securing member 56 and, after then, the operation knob 51 may be rotated oppositely to the arrow G direction.

As described above, with use of the set angle adjusting mechanism 5 according to the present embodiment, by rotating the operation knob 51 provided on the receive base 3, the angle of the seat main body can be set at the desired angle while the angle of the receive base 3 with respect to the vehicle seat remains unchanged. Also, since the present angle setting is accomplished through the meshing engagement between the gears 58 and tooth portions 53b, a fine angle adjustment can be made.

By the way, when making the angle adjustments using the present set angle adjusting mechanism 5 in the above-mentioned manner, it is desirable to confirm the angle visually. For this purpose, as has been previously explained with reference to FIG. 6, there is provided the angle display device 9. However, as the structure of the angle display device 9, there can be employed various structures which will be illustrated in the following embodiments thereof. Now, description will be given below in detail of the respective embodiments of the angle display device 9.

First Embodiment of Angle Display Device

Next, the respective embodiments of the angle display device 9 will be described below sequentially from the first embodiment thereof.

Figure 15:
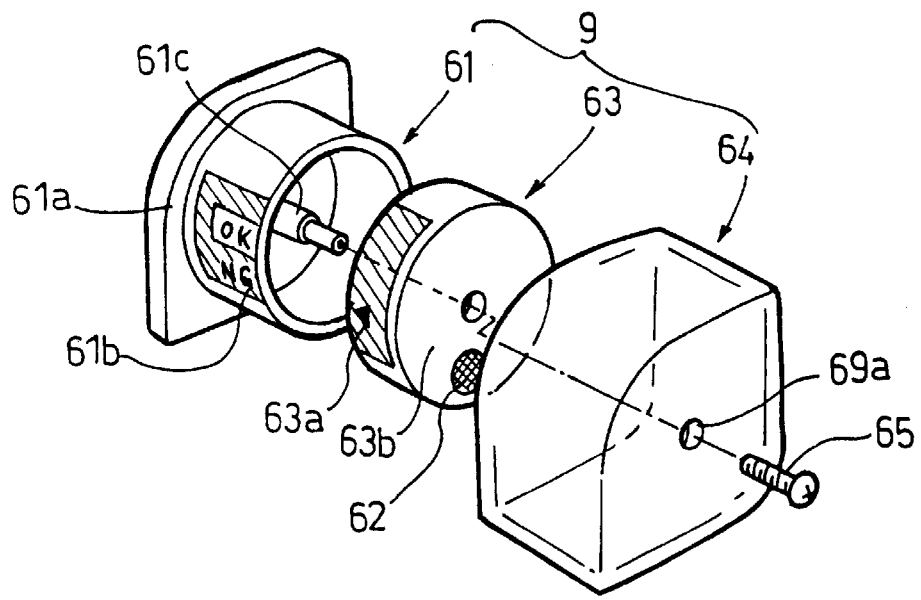
FIG. 15 is an exploded perspective view of a first embodiment of an angle display device according to the invention.

The first embodiment relates to the angle display device 9 that is shown in FIG. 6. The angle display device 9, as shown in FIGS. 15 and 16, comprises a cylindrical-shaped display part 61, an indicating part 63 which is formed in a cylindrical shape and includes a weight 62 fixed to one end of the interior portion thereof, a case 64, and the like; and, these components of the angle display device 9, except for the weight 62, are molded of synthetic resin respectively.

The display part 61 is composed of a flat-plate-shaped fixing portion 61a, a cylindrical body 61b having characters such as "OK" (good), "NG"(no good), and the like printed on the outer surface thereof, and a shaft 61c for supporting the indicating part 63 in a freely rotatable manner. Referring to the structure of the indicating part 63, the weight 62 is fixed to the interior portion of the cylindrical body 63b with an arrow mark 63a printed on the outer surface thereof and, as shown in FIG. 16, in the center of the cylindrical body 63b, there is disposed a bearing 63c through which the shaft 61c can be inserted.

The case 64 is formed transparent and is structured in such a manner as to cover the whole of both the display part 61 and indicating part 63. Also, in a portion of the case 64, there is formed a screw insertion hole 64a.

Figure 16:
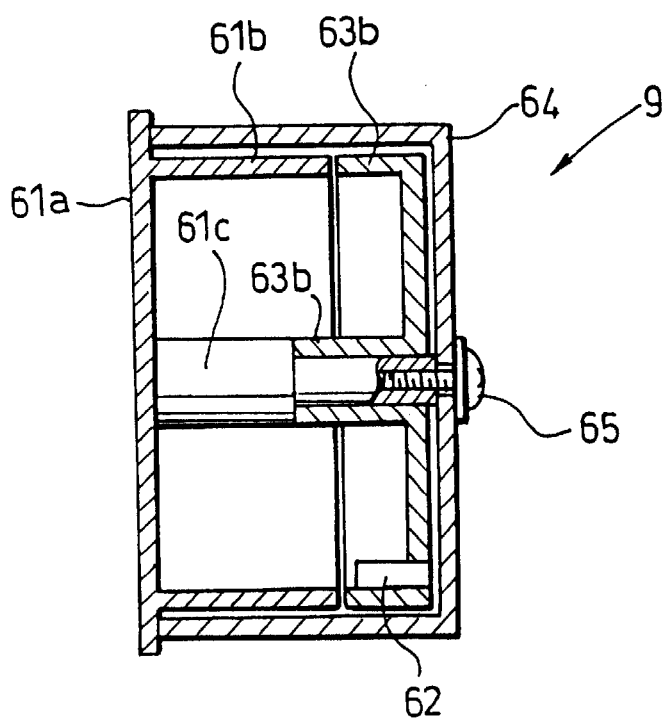
FIG. 16 is a section view of the first embodiment of an angle display device according to the invention.

And, referring to the structure of the angle display device 9, as shown in FIG. 16, the bearing 63c provided in the indicating part 63 is fitted over the shaft 61c provided in the display part 61, the cover 64 is placed over the display part 61 and indicating part 63 to cover them completely, and the cover 64 is fixed to the top portion of the shaft 61c by a screw 65. According to the present structure, the indicating part 63 can be freely rotated with respect to the display part 61.

Therefore, if the fixing portion 61a of the display part 61 is fixed to the child seat 1 by screwing or by other similar means, then the display part 61 can be inclined in accordance with the inclination of the child seat 1: that is, in the above-mentioned first to third embodiments of the set angle adjusting mechanism according to the invention, the display part 61 can be inclined in accordance with the inclination of the receive base 3; and, in the above-mentioned fourth embodiment of the set angle adjusting mechanism according to the invention, the display part 61 can be inclined in accordance with the inclination of the seat main body 4. However, since the indicating part 63 is prevented from inclining due to the operation of the weight 62, "OK" or "NG" is indicated in accordance with the angle difference between the display part 61 and indicating part 63.

By mounting the above-mentioned angle display device 9 onto the child seat 1, a user is able to adjust the angle of the child seat 1 while observing the angle display device 9 visually. Therefore, not only the safety of the baby or little child can be enhanced but also the convenience of the child seat in handling can be improved.

Second Embodiment of Angle Display Device

Figure 17:
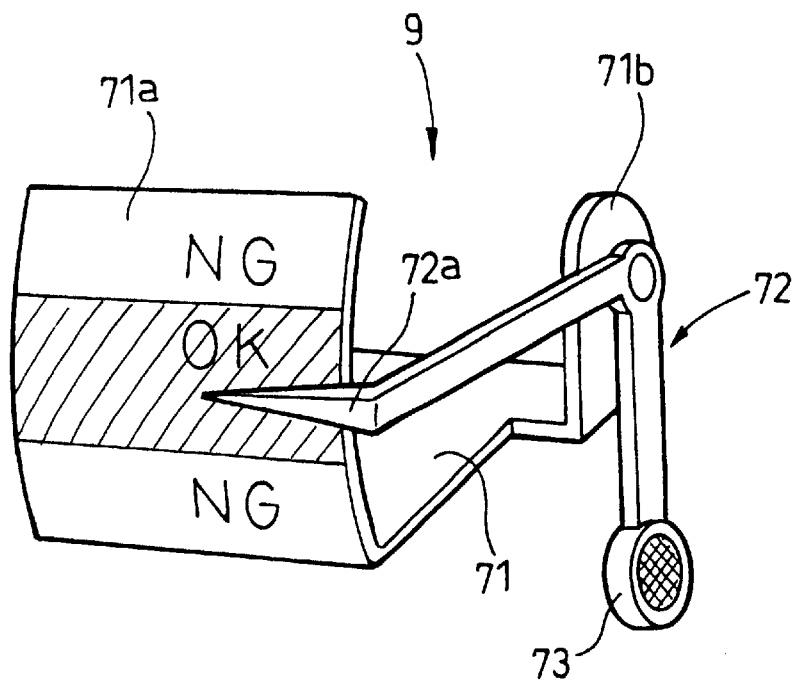
FIG. 17 is a perspective view of a second embodiment of an angle display device according to the invention.

Next, description will be given below of a second embodiment of the angle display device 9 according to the invention with reference to FIG. 17. In the second embodiment, characters such as "OK", "NG" and the like are printed on the outer surface of a base plate 71 to thereby form a display part 71a. Also, part of the base plate 71 is folded to thereby form a bearing part 71b, while an L-shaped indicating member 72 is rotatably mounted on the bearing part 71b. One end portion of the indicating member 72 provides an indicator 72a which is used to indicate the characters such as "OK", "NG" and the like, whereas a weight 73 is fixed to the other end portion of the indicating member 72.

According to the present embodiment, the base plate 71 is fixed to a portion of the child seat 1. And, if the child seat 1 is inclined, then the base plate 71 is also inclined, whereas the indicator 72a of the indicating member 72 is prevented against inclination due to the operation of the weight 73. Therefore, "OK" or "NG" is indicated by the indicator 72a in accordance with the inclination angle difference between the base plate 71 and indicator 72a.

The present embodiment as well can provide similar effects to the previously described first embodiment of the angle display device.

Third Embodiment of Angle Display Device

Figure 18:
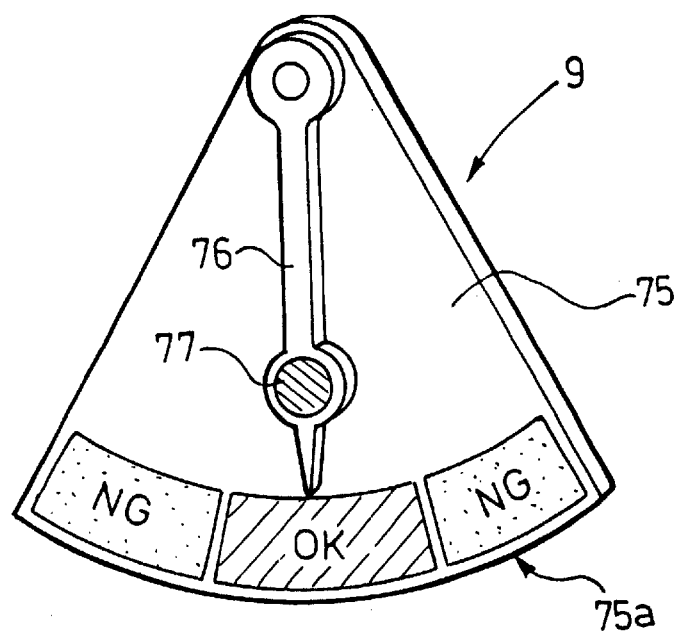
FIG. 18 is a perspective view of a third embodiment of an angle display device according to the invention.

Next, description will be given below of a third embodiment of the angle display device 9 according to the invention with reference to FIG. 18.

In the third embodiment, characters such as "OK", "NG" and the like are printed on the outer surface of a flat-plate-shaped base plate 75 to thereby form a display part 75a, while an indicator 76 is rotatably mounted on the upper portion of the display part 75a. And, a weight 77 is fixed to the indicator 76.

According to the present structure, if the base plate 75 is fixed to a portion of the child seat 1, then the display part 75a is inclined integrally with the child seat 1, whereas the indicator 76 is prevented against inclination due to the operation of the weight 77. Therefore, in the present embodiment as well, the child seat 1 can be set to a desired inclination angle while observing the degree of the inclination of the child seat 1 visually.

Fourth Embodiment of Angle Display Device

Figure 19:
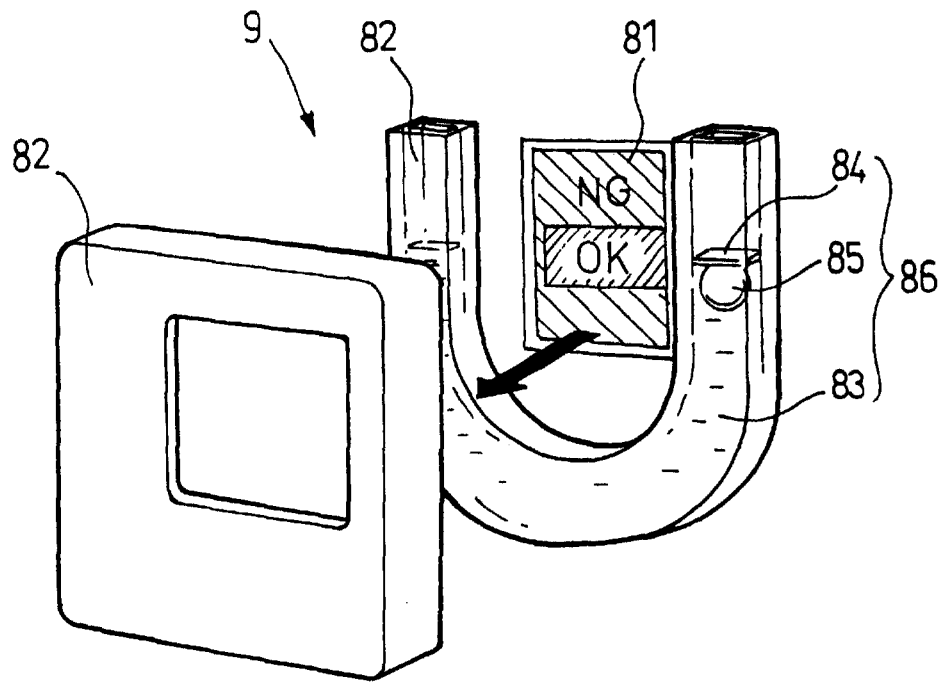
FIG. 19 is a perspective view of a fourth embodiment of an angle display device according to the invention.

Next, description will be given below of a fourth embodiment of the angle display device 9 according to the invention with reference to FIG. 19.

The angle display device 9 according to the fourth embodiment comprises a flat-plate-shaped display part 81 with characters such as "OK", "NG" and the like printed thereon, a U-shaped cylindrical body 82 into which liquid 83 such as water or the like is charged, an indicating part 86 structured such that a float 85 forming an indicator 84 is disposed in such a manner as to float on one of the surfaces thereof, a cover 87, and the like.

According to the present structure, even if the indicating part 81 and cylindrical body 82 are inclined, the height of the float remains unchanged. Therefore, when the thus structured angle display device 9 is mounted to the child seat 1, the indicator 84 is able to indicate the characters such as "OK", "NG" and the like in accordance with the inclination of the indicating part 81 and cylindrical body 82. That is, according to the present embodiment as well, similarly to the previously described embodiments of the angle display device 9, the angle of the child seat 1 can be adjusted. By the way, as the liquid 83, besides water, there can also be used oil-based liquid which is hard to freeze.

Fifth Embodiment of Angle Display Device

Figure 20:
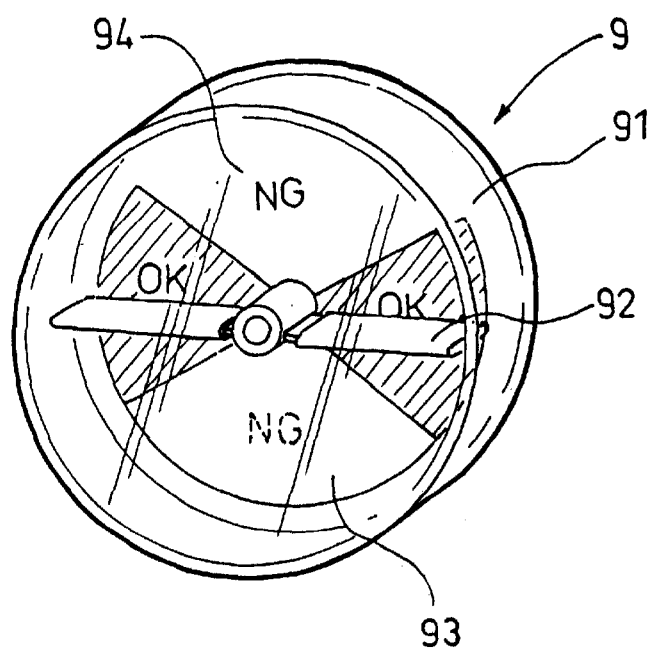
FIG. 20 is a perspective view of a fifth embodiment of an angle display device according to the invention.

Next, description will be given below of a fifth embodiment of the angle display device 9 according to the invention with reference to FIG. 20.

The angle display device 9 according to the present embodiment is structured such that a plate-shaped indicating member 92 floatable on liquid is rotatably mounted in the central portion of a disk-shaped transparent vessel 91 and liquid 93 is charged into only the lower half section of the vessel 91. And, characters such as "OK", "NG" and the like are printed on the inner surface of the vessel 91 and thus the present inner surface forms a display part 94.

According to the present structure, even if the vessel 91 is inclined as a whole, the indicating member 92 can be kept horizontally due to the liquid 93. This allows the indicating member 92 to indicate the characters such as "OK", "NG" and the like. That is, according to the present embodiment as well, similarly to the previously described embodiments, the angle of the child seat 1 can be adjusted.

Sixth Embodiment of Angle Display Device

Figure 21:
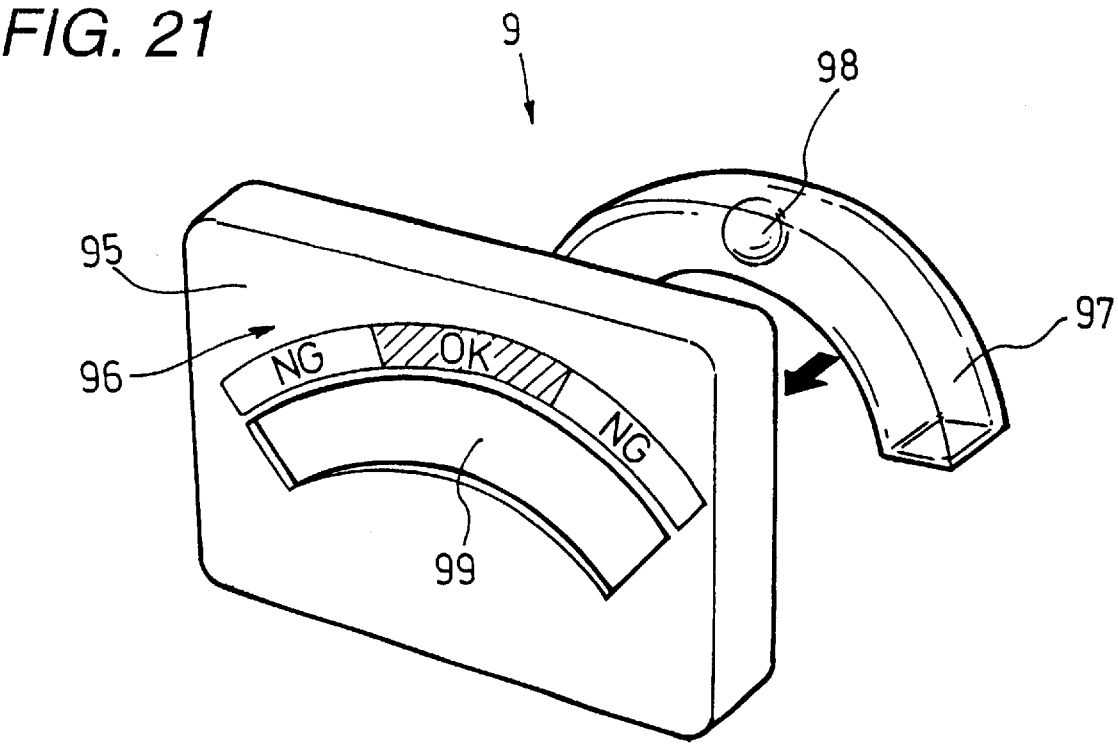
FIG. 21 is a perspective view of a sixth embodiment of an angle display device according to the invention.

Next, description will be given below of a sixth embodiment of the angle display device 9 according to the invention with reference to FIG. 21.

The present embodiment also has a structure which makes use of the characteristic of liquid. That is, characters such as "OK", "NG" and the like are printed on the surface of a cover 95 to thereby form a display part 96, liquid is charged into an arc-shaped transparent cylindrical body 97, and a float 98 serving as an indicator is disposed in such a manner that it floats on the liquid. To assemble these components together, the cylindrical body 97 say be fitted with an arc-shaped opening 99 which is formed in the cover 95.

According to the present structure, while the present angle display device 9 is inclined as a whole in accordance with the inclination of the child seat 1, the float 98 is allowed to move along the arc surface of the cylindrical body 97 and thus the float 98 is always positioned in the top portion of the cylindrical body 97. As a result of this, the characters ouch as "OK", "NG" and the like can be pointed out by the float 98, which makes it possible to observe the inclination of the child seat 1 visually.

Seventh Embodiment of Angle Display Device

Figure 22:
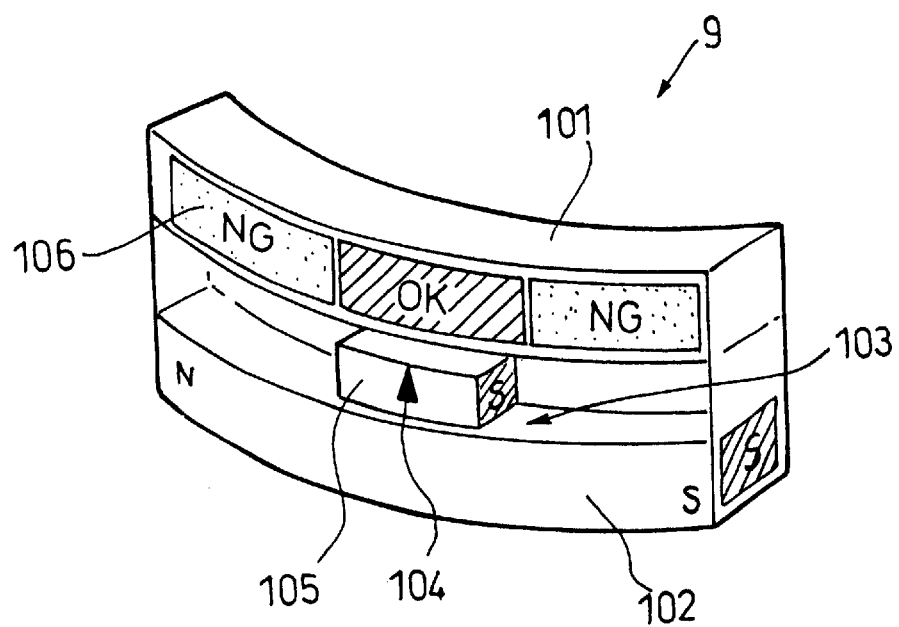
FIG. 22 is a perspective view of a seventh embodiment of an angle display device according to the invention.
Figure 23:
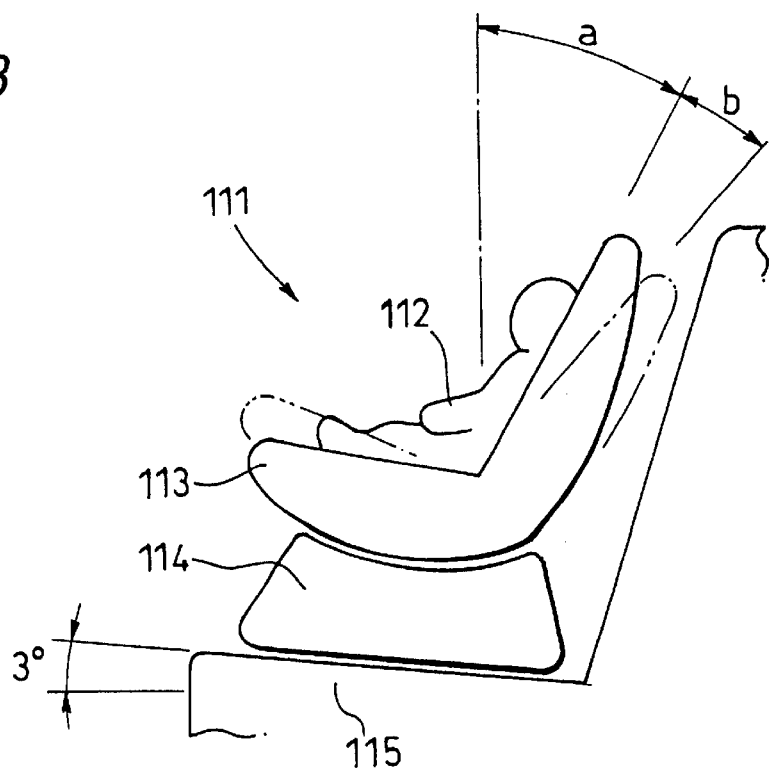
FIG. 23 is a typical side view of an example of a conventional child seat.
Figure 24:
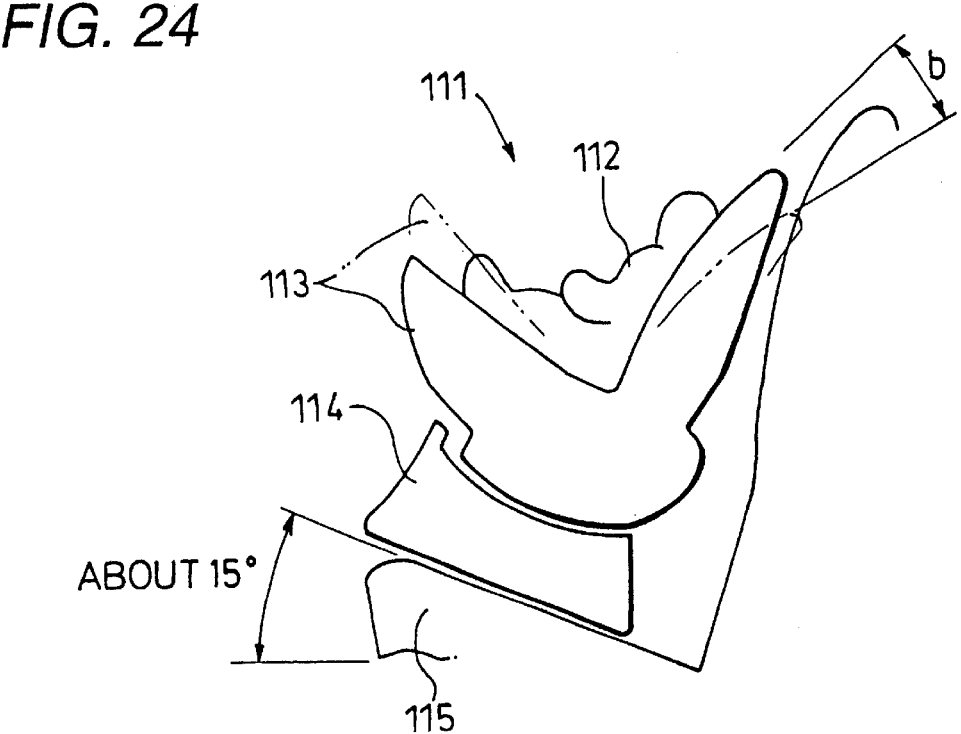
FIG. 24 is a typical side view of an example of a conventional child seat, showing a child seat angle adjusting mechanism employed therein.
Figure 25:
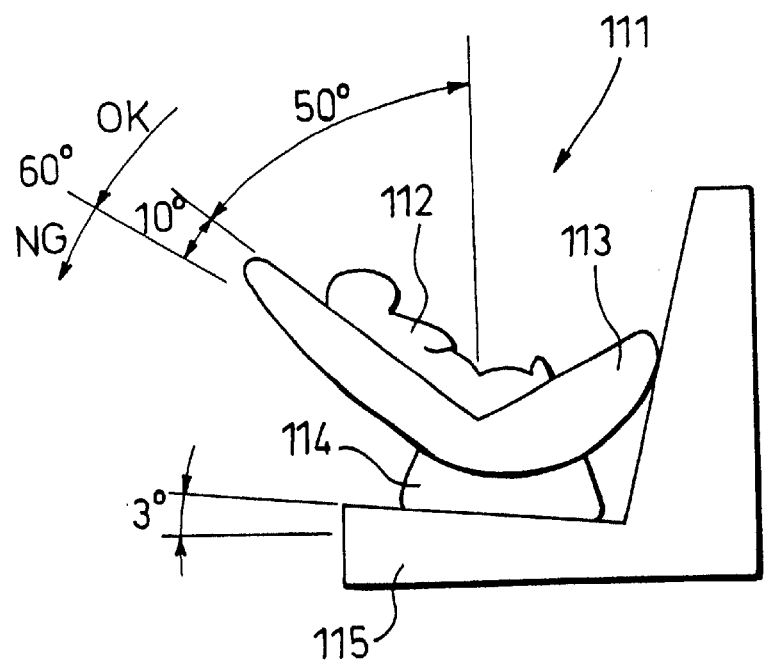
FIG. 25 is a typical side view of an example of a conventional child seat, showing the child seat angle adjusting mechanism and problems found therein; and, FIG. 26 is a typical side view of an example of a conventional child seat, showing the child seat angle adjusting mechanism and problems found therein.
Figure 26:
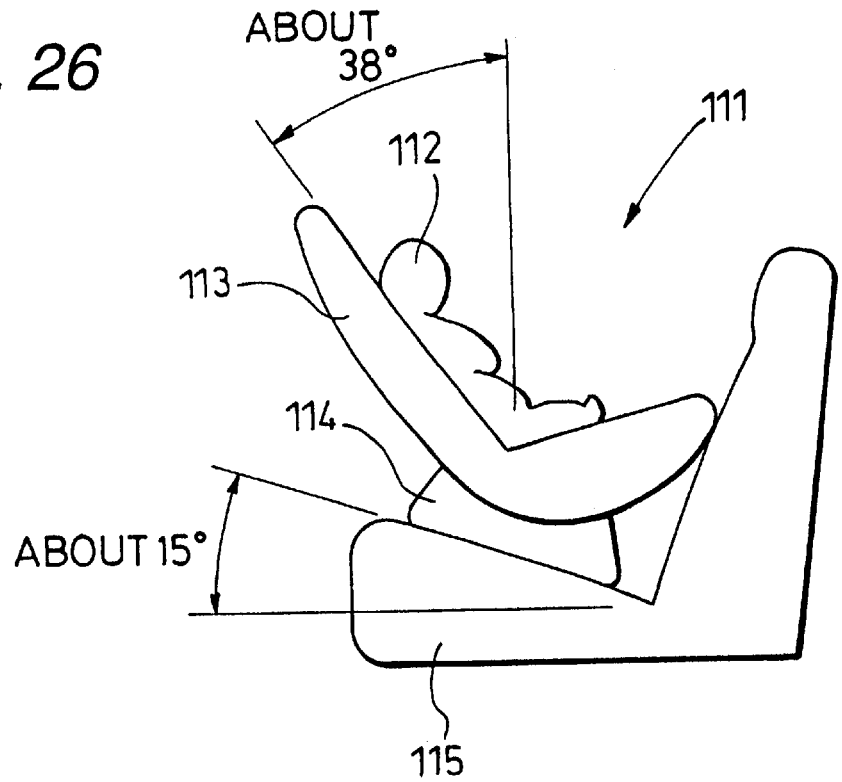

Next, description will be given below of a seventh embodiment of the angle display device 9 according to the invention with reference to FIG. 22.

The present embodiment makes use of a magnetic operation. That is, a permanent magnet 102 magnetized in the N and S poles thereof is disposed in the lower portion of the interior portion of a frame body 101 which is formed in an arc shape when viewed from the upper surface thereof, and a magnetized magnetic piece 105 with an indicator mark 104 formed therein is stored into a guide portion 103 which is composed of an arc-shaped space formed upwardly of the permanent magnet 102. The magnetic piece 105 floats slightly with respect to the permanent magnet 102 and can be moved in the lateral direction thereof. Also, at the positions of the outer surface of the frame body 101 that correspond to the upper portion of the magnetic piece 105, there are printed characters such as "OK", "NG" and the like to thereby form a display part 106.

According to the present structure, when the angle display device 9 is inclined integrally with the child seat 1, the magnetic piece 105 is moved due to its magnetic action with respect to the permanent magnet 102, thereby being able to point out the characters such as "OK", "NG" and the like. Thanks to this, similarly to the previously described embodiments of the angle display device 9, the angle of the child seat 1 can be adjusted while observing the degree of inclination of the child seat 1 visually.

By the way, although description has been given hereinbefore of the child seat 4 which is structured such that the seat main body 4 thereof can be rotated with respect to the receive base 3. However, the invention can also be applied to a child seat 1 which is structured such that the seat main body 4 cannot be rotated with respect to the receive base 3.

Also, although description has been given heretofore in the illustrated embodiments of the child seat 1 in which the receive base 3 and seat main body 4 are originally produced as separate members and are then assembled together, however, it is not always necessary to produce the receive base 3 and seat main body 4 as separate members, but they can also be produced originally as an integral body, Further, each embodiment in not limited by the child seat regardless of existence of the receive base.

Further, in the foregoing description, the angle display device is interposed between the receive base 3 of the child seat 1 and the vehicle seat 2 or between the receive base 3 and seat main body 4 of the child seat 1. However, the setting position of the angle display device is not limited to this, but the angle display device can also be set in both of them.

As has been described heretofore, a child seat according to the invention is structured such that a set angle adjusting mechanism in disposed in a receive base forming the child seat and, when fixing the receive base to a vehicle seat, the angle of the receive base can be adjusted by the set angle adjusting mechanism. According to the present structure, even if the elevation angle of the vehicle seat is set for a steep angle of about 15°, the angle of the seat main body of the child seat can be set similarly to a vehicle seat having an elevation angle of 3° which is specified in the collision test. For this reason, the angle of the seat main body to be supported on the upper portion of the receive base can be set regardless of the elevation angle of the seat surface of the vehicle seat. As a result of this, not only the comfort of a baby or a little child can be maintained but also, in a collision, the baby or little child can be prevented from flying out from the child seat, thereby being able to enhance the safety of the baby or little child. Also, since an angle display device is disposed in the receive base and/or seat main body of the child seat, in the above-mentioned angle adjusting operation, the angle of the child seat can be adjusted while observing the angle of the child seat visually.

By the way, in the foregoing description, the child seat is structured such that the seat main body 4 can be rotated with respect to the receive base 3. However, the invention can also apply to a child seat which is structured such that the seat main body 4 cannot be rotated with respect to the receive base 3.

Also, a child seat according to the invention is structured such that a set angle adjusting mechanism is disposed in a receive base forming the child seat and, in a state where the receive base in fixed to a vehicle seat, the angle of a seat main body forming the child seat is adjusted by the set angle adjusting mechanism. According to the present structure, even if the elevation angle of the vehicle seat is set for a steep angle of 15°, without adjusting the angle of the receive base, the angle of the seat main body can be set similarly to a vehicle seat having an elevation angle of 3° which is specified in the collision test. Therefore, similarly to the previously described case, the angle of the seat main body to be supported on the upper portion of the receive base can be set regardless of the elevation angle of the seat surface of the vehicle seat. As a result of this, not only the comfort of a baby or a little child can be maintained but also, in a collision, the baby or little child can be prevented from flying out from the child seat. Also, since an angle display device is disposed in the receive base and/or seat main body of the child seat, in the above-mentioned angle adjusting operation, the angle of the child seat can be adjusted while observing the angle of the child seat visually, which can enhance the convenience of the child seat.

What is claimed is:

1. A child seat to be set on a vehicle seat comprising:
   a seat main body; and
   a set angle adjusting mechanism for adjusting the set angle of said seat main body with respect to said vehicle seat, said set angle adjusting mechanism includes:
      a primary rotary plate rotatably stored in a recessed portion formed in the bottom portion of said child seat;
      a secondary rotary plate disposed in said primary rotary plate in such a manner that one end portion thereof can be rotated; and
      a securing portion formed within said recessed portion for securing the other end portion of said secondary rotary plate.

2. A chile seat as claimed in claim 1, wherein said set angle adjusting mechanism is disposed in a contact portion of said seat main body where said seat main body is to be contacted with said vehicle seat.

3. A child seat as claimed in claim 1, further comprising:
   a receive base for receiving said seat main body thereon.

4. A child seat as set forth in claimed in claim 1, further comprising:

an angle display device for displaying whether the inclination angle of said child seat is proper or not.

5. A child seat to be set on a vehicle seat comprising:

a seat main body;

a receive base for receiving said seat main body thereon; and a set angle adjusting mechanism for adjusting the set angle of said seat main body with respect to said vehicle seat, said set angle adjusting mechanism is disposed in a contact portion of said receive base where said receive base is to be contacted with said vehicle seat.

6. A child seat as set forth in claimed in claim 5, wherein said set angle adjusting mechanism includes:

a primary rotary plate rotatably stored in a recessed portion formed in the bottom portion of said child seat;

a secondary rotary plate disposed in said primary rotary plate in such a manner that one end portion thereof can be rotated; and a securing portion formed within said recessed portion for securing the other end portion of said secondary rotary plate.

7. A child seat as set forth in claim 5, further comprising:

an angle display device including:

a cylindrical-shaped display member having a shaft at the center thereof, said display member fixed on one of said child seat and said receive base;

a cylindrical-shaped indicating member freely rotatably supported by said shaft; and a weight fixed to one end of the interior portion of said cylindrical-shaped, wherein said cylindrical-shaped display member is inclined in accordance with the inclination of one of said child seat and receive base, and the indicating member is prevented from to be inclined to indicate the angle difference between said display member and said indicating member.

8. A child seat to be set on a vehicle seat comprising:

a seat main body;

a set angle adjusting mechanism for adjusting the set angle of said seat main body with respect to said vehicle seat; and an angle display device for displaying whether the inclination angle of said child seat is proper or not, said angle display device includes:

a cylindrical-shaped display member having a shaft at the center thereof, said display member fixed on one of said child seat and said receive base;

a cylindrical-shaped indicating member freely rotatably supported by said shaft; and a weight fixed to one end of the interior portion of said cylindrical-shaped indicating member, wherein said cylindrical-shaped display member is inclined in accordance with the inclination of one of said child seat and receive base, and the indicating member is prevented from to be inclined to indicate the angle difference between said display member and said indicating member.

9. A child seat to be set on a vehicle seat comprising:

a seat main body; and an angle display device for displaying whether the inclination angle of said child seat is proper or not, said angle display device includes:

a cylindrical-shaped display member having a shaft at the center thereof, said display member fixed on one of said child seat and said receive base;

a cylindrical-shaped indicating member freely rotatably supported by said shaft; and a weight fixed to one end of the interior portion of said cylindrical-shaped indicating member, wherein said cylindrical-shaped display member is inclined in accordance with the inclination of one of said child seat and receive base, and the indicating member is prevented from to be inclined to indicate the angle difference between said display member and said indicating member.

10. A child seat as claimed in claim, 9 further comprising:

a receive base for receiving said seat main body thereon.

11. A child seat as set forth in claim 10, wherein the inclination angle of said child seat is set in the angle range of 35°–55° with respect to a vertical line.

* * * * *